United States Patent
Yamamoto

(10) Patent No.: US 7,664,599 B2
(45) Date of Patent: Feb. 16, 2010

(54) APPARATUS FOR GENERATING DIGITAL LANE MARK

(75) Inventor: Tadashi Yamamoto, Hiroshima (JP)

(73) Assignee: Sanei Co., Ltd., Hiroshima (JP)

( * ) Notice: Subject to any disclaimer, the term of this patent is extended or adjusted under 35 U.S.C. 154(b) by 887 days.

(21) Appl. No.: 11/167,191

(22) Filed: Jun. 28, 2005

(65) Prior Publication Data
US 2006/0020389 A1    Jan. 26, 2006

(30) Foreign Application Priority Data
Jul. 1, 2004    (JP)    ............... 2004-195135
Jun. 24, 2005   (JP)    ............... 2005-184419

(51) Int. Cl.
*G06K 9/00*    (2006.01)

(52) U.S. Cl. .................... 701/213; 348/113

(58) Field of Classification Search ................ 701/213, 701/23, 28, 42, 207; 382/103, 104, 199; 340/941, 901, 439, 907, 933; 73/146; 180/421, 180/168; 348/113, 149
See application file for complete search history.

(56) References Cited

U.S. PATENT DOCUMENTS

| | | | |
|---|---|---|---|
| 5,793,491 A | * | 8/1998 | Wangler et al. ............ 356/613 |
| 6,711,480 B2 | * | 3/2004 | Yamamoto et al. ............ 701/23 |
| 6,813,370 B1 | * | 11/2004 | Arai ............................ 382/104 |
| 6,850,628 B2 | * | 2/2005 | Shirato ........................ 382/104 |
| 6,879,706 B2 | * | 4/2005 | Satoh et al. ................. 382/104 |

FOREIGN PATENT DOCUMENTS

| | | |
|---|---|---|
| JP | 10-261193 | 9/1998 |
| JP | 11-212640 | 8/1999 |

* cited by examiner

*Primary Examiner*—Dalena Tran
(74) *Attorney, Agent, or Firm*—Wenderoth, Lind & Ponack, L.L.P.

(57) ABSTRACT

A digital lane mark generation apparatus generates a highly accurate and inexpensive three-dimensional mathematical expression orbit map (a digital lane mark). The apparatus includes a GPS coordinate reception unit obtaining GPS coordinates (X, Y, Z), a gyro sensor calculating measurement values of a gradient ($\psi$, $\theta$, $\phi$), a camera device, a distance meter measuring a driving distance measuring point (l), a speed meter measuring a speed, a steering angle sensor measuring a steering angle ($\rho$), a road surface roughness sensor detecting a road surface roughness ($\delta$), an IC tag information reception unit detecting IC tag position information, an internal timer, and a digital lane mark generation unit generating the digital lane mark by relating obtained information to a standard time, and by using a line segment, a circular arc, and/or a clothoid curve.

15 Claims, 20 Drawing Sheets

FIG.2
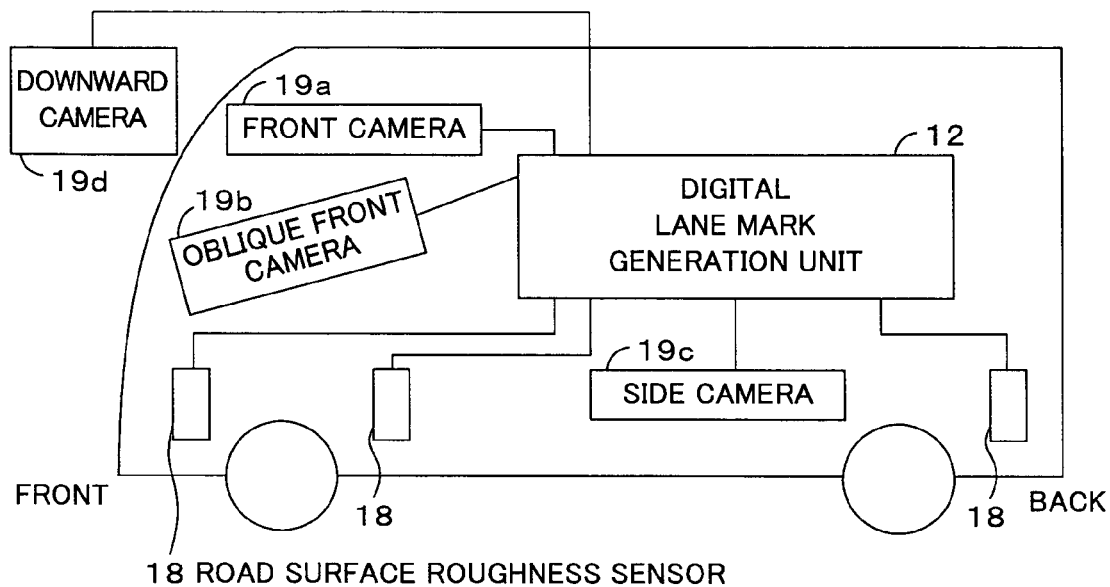
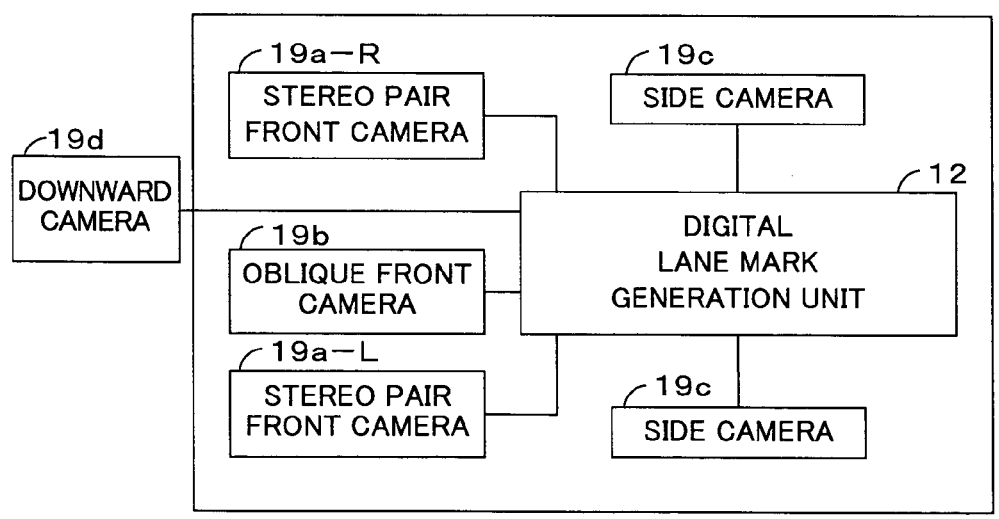

FIG.3A
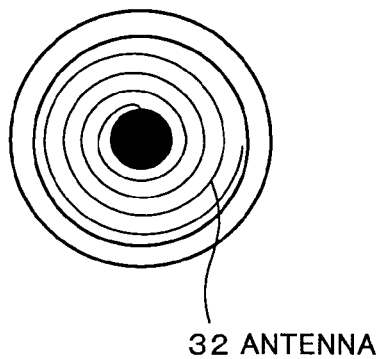
32 ANTENNA
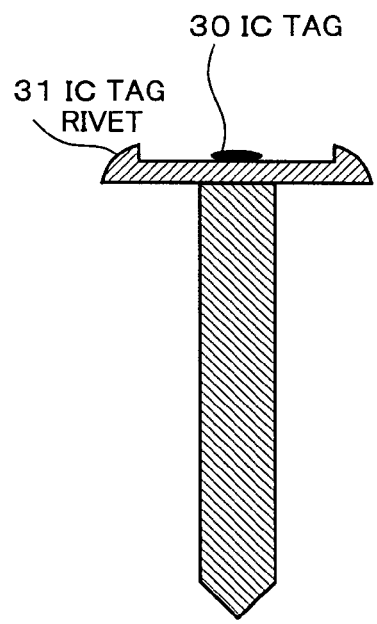
30 IC TAG
31 IC TAG RIVET
FIG.3B
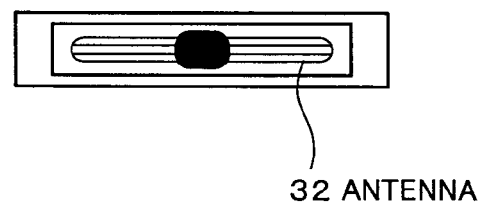
32 ANTENNA
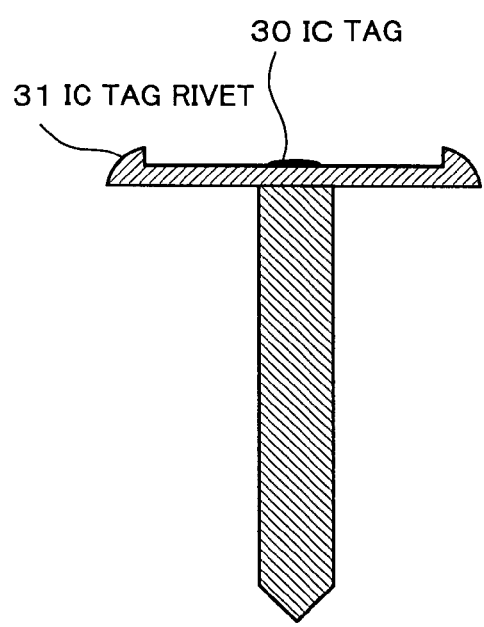
30 IC TAG
31 IC TAG RIVET

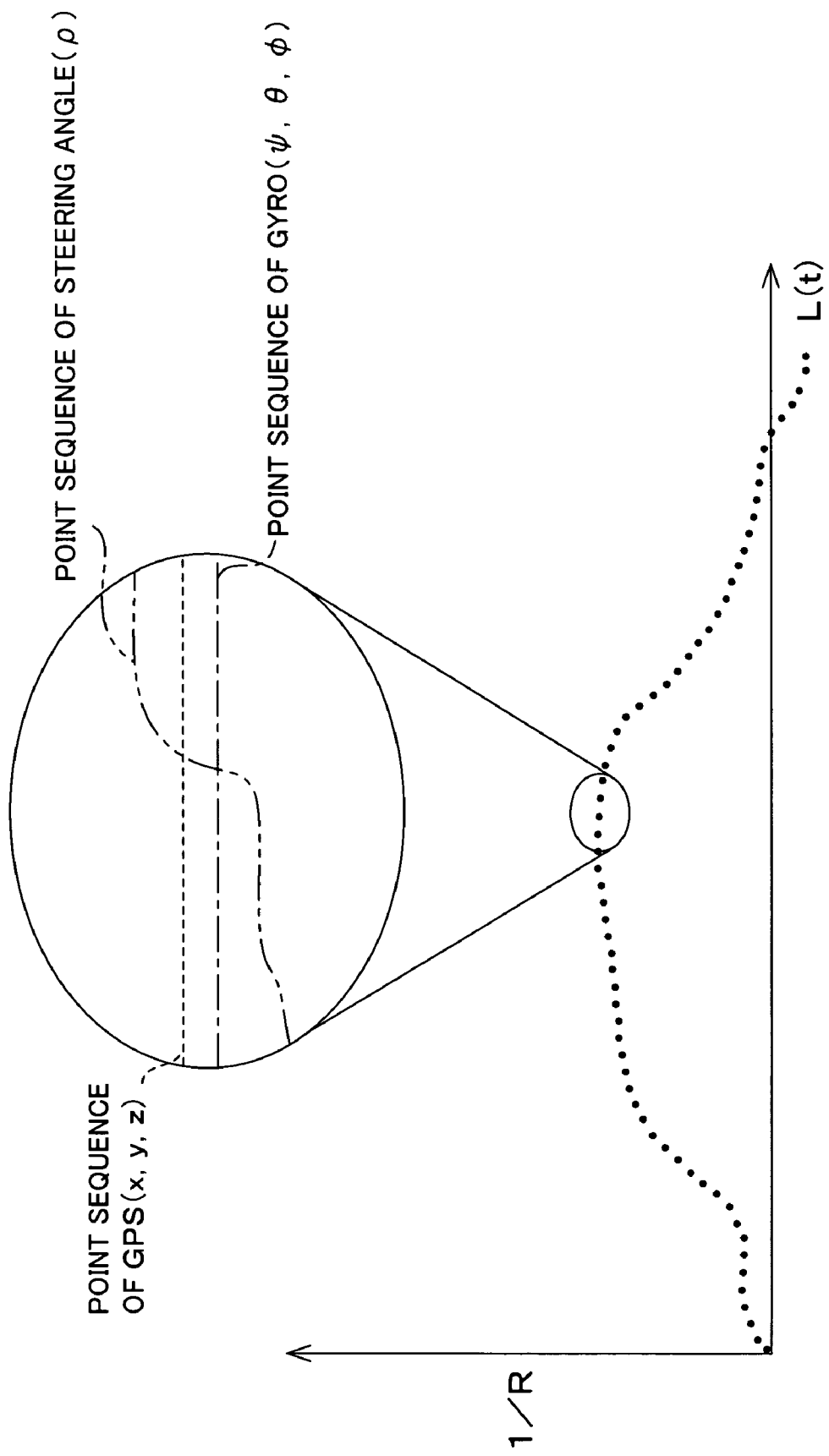

STRAIGHT LINE SECTION S

CIRCULAR ARC SECTION R

CLOTHOID SECTION A

CLOTHOID SECTION A
(OVAL-SHAPED)

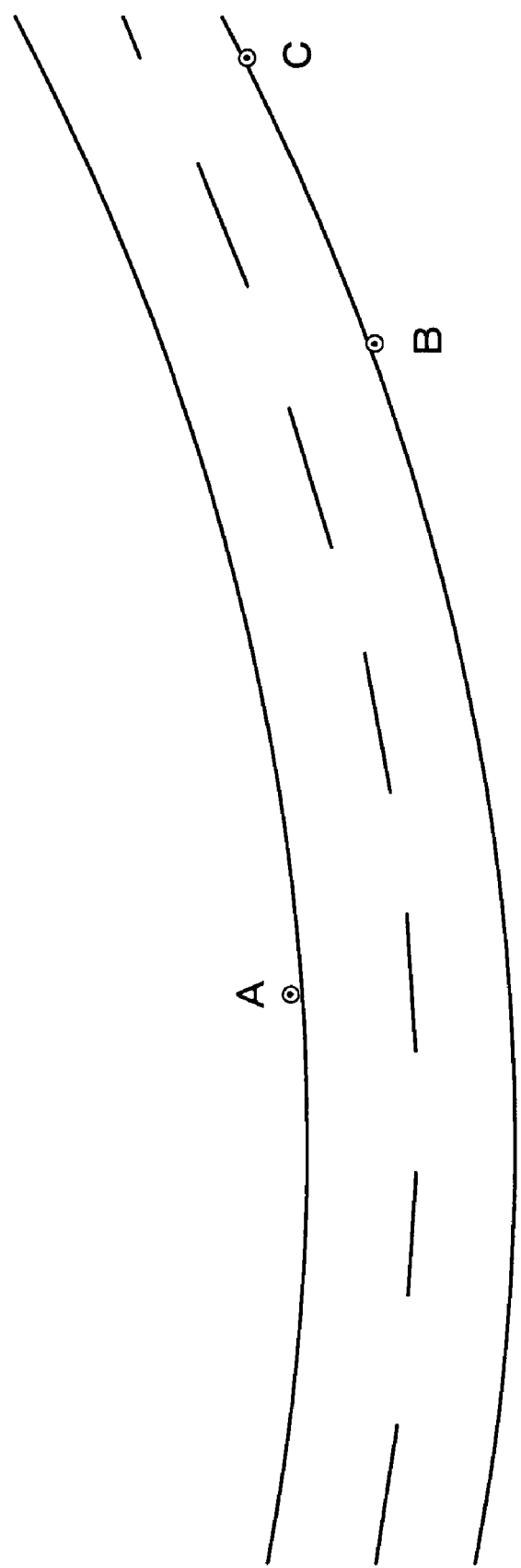

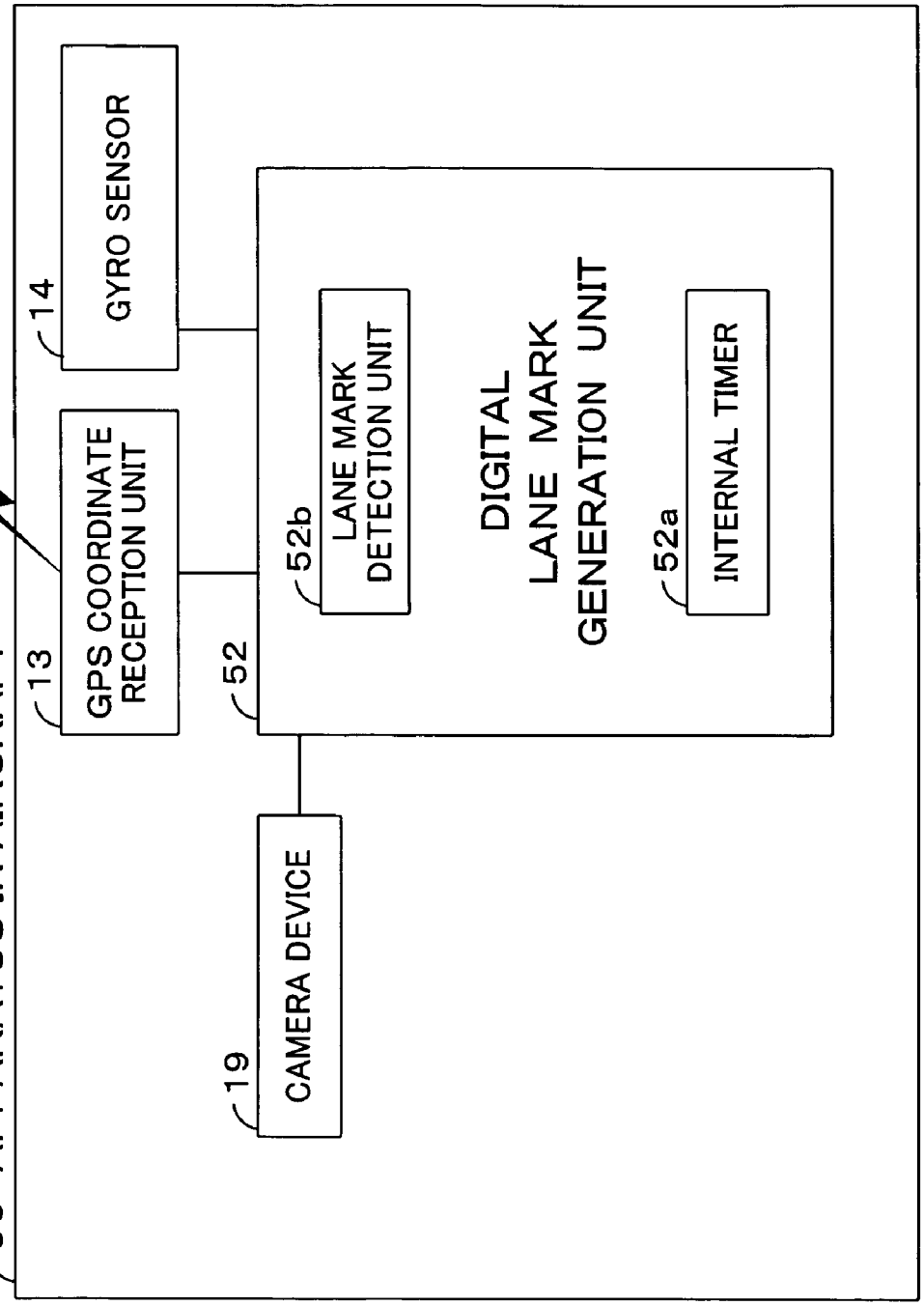

APPARATUS FOR GENERATING DIGITAL LANE MARK

TECHNICAL FIELD

This invention relates to an apparatus for generating a digital lane mark indicating the driving orbit of a vehicle like a car. In particular, this invention relates to an apparatus for generating a highly accurate and inexpensive three dimensional mathematical expression orbit map (the digital lane mark).

BACKGROUND ART

Conventionally, there are a driving support apparatus to support driving a vehicle like a car safely and an automatic driving apparatus to drive a vehicle automatically. For example, Japanese Patent Laid-open No. 11-212640 and Japanese Patent Laid-open No. 10-261193 disclose such examples. Below, conventional vehicle systems to drive a car automatically are explained.

The conventional vehicle system installed in each vehicle obtains traffic conditions of the driving route from the GPS (Global Positioning System) to calculate the best driving route and the system drives a car automatically based on (i) position information of lane marks of the road obtained from the CCD (Charge Coupled Device) camera and the like, (ii) information communicated between nearby vehicles, and (iii) navigation information from the GPS.

The other vehicle system installed in a vehicle obtains traffic conditions of the driving route from the GPS and the LCX (Leakage Coaxial Cable) to calculate the best driving route and detect lane markers placed on the road with certain intervals. Then the system drives a vehicle automatically based on detected information of these lane markers and information obtained from the communication between driving vehicles on the road and the LCX.

In such systems, to grasp the driving orbit accurately is substantially important, therefore, some people make a suggestion to use a map database of a car navigation system.

DISCLOSURE OF THE INVENTION

According to the conventional vehicle systems using the GPS, the LCX, and the CCD, however, the systems have to process all position information such as traffic conditions of the driving route from the GPS, position information of a lane mark on the road, information communicated between vehicles, and navigation information from the GPS. Moreover, such information cannot be properly used when visibility is poor because of a frost, a snowfall, weather conditions, the night time, a curved road, and a top of a hill Also, according to the vehicle system using a map database of the car navigation system, there is a problem that the map database is not sufficiently accurate for the feedback control and the preview control of the vehicle.

Moreover, during actual driving of the vehicle, the vehicle may drive out of the calculated driving orbit generated by the system because of the various conditions and circumstances of the vehicle such as a one-sided load, a one-sided break, a speed change of the vehicle by acceleration or deceleration, and a structural unbalance, or because of the various conditions and circumstances of a road structure such as a longitudinal gradient and a crossing gradient cant of the road. Hence, the errors of the driving orbit caused by these kinds of conditions and circumstances have to be corrected.

These corrections require precise position information of the vehicle. To obtain such accurate information, intervals of the sampling from the GPS need to be short. However, the shorter interval sampling requires the shorter processing time of information from the GPS, which increases the load on the system to cause the problem of processing ability of the system.

In addition, poor reception of GPS information because of buildings and geographic conditions such as a hollow and errors of the altitude prevent accurate position information from being obtained, making it difficult to correct the driving orbit of the vehicle.

Accordingly, one object of this invention is to provide a digital lane mark generation apparatus capable of generating a highly accurate and inexpensive three dimensional mathematical expression orbit map (the digital lane mark).

In order to attain the above object, the digital lane mark generation apparatus of a first aspect of the invention is a digital lane mark generation apparatus in a vehicle for generating a digital lane mark indicating the driving orbit of a vehicle, including GPS coordinate reception means for obtaining GPS coordinates which are global geodetic coordinates (X, Y, Z) of the vehicle from a GPS satellite; gyro sensor means for calculating measurement values of a gradient ($\psi$, $\theta$, $\phi$) by measuring a gradient of the vehicle; one or more cameras for photographing the outside of the vehicle as a camera image; and digital lane mark generation means for generating a digital lane mark indicating the driving orbit of the vehicle, by relating the global geodetic coordinates (X, Y, Z), the measurement values of the gradient ($\psi$, $\theta$, $\phi$), and a camera image, to a standard time (t), and by using a line segment (S), a circular arc (R), a clothoid curve (A), an altitude (Z), a longitudinal gradient, and/or a crossing gradient cant.

Here, one or more cameras may be a front camera for photographing the front of the vehicle, an oblique front camera for photographing a diagonally forward underneath, a side camera for photographing a side of a vehicle, and/or a downward camera for photographing directly below the vehicle. The digital lane mark generation means may use all or part of the camera image photographed by the front camera, the oblique front camera, the side camera, and the downward camera.

The cameras may be a plurality of stereo pair front cameras for photographing the front of the vehicle. The digital lane mark generation means may use the camera image photographed by a plurality of the stereo pair front cameras. An additional front camera or cameras to two of them further improve accuracy.

The side camera and the downward camera may be line sensors that recognize lane mark information, and the digital lane mark generation means may quickly process and use lane mark information recognized by the line sensor.

The digital lane mark generation apparatus may further include a distance meter for measuring a driving distance measuring point (1) of a driving distance of the vehicle, and the digital lane mark generation means may generate the digital lane mark by relating the driving distance measuring point (1) to the standard time (t).

The digital lane mark generation apparatus may further include a speedometer for measuring a speed (v) of the vehicle and generates the digital lane mark by relating the speed (v) of the vehicle to the standard time (t).

Also, the digital lane mark generation means may further include a steering angle sensor for measuring a steering angle (ρ) of a steering wheel of the vehicle and may generate the digital lane mark by relating the steering angle (ρ) to the standard time (t).

Also, the digital lane mark generation means may further include one or more road surface roughness sensors for detecting the road surface roughness (δ) and may generate the digital lane mark by relating the road surface roughness (δ) to the standard time (t).

The digital lane mark generation means may further include IC tag information reception means for detecting tag position information from an IC tag placed on a road surface and generate the digital lane mark by relating tag position information to the standard time (t).

In order to attain the above object, the digital lane mark generation apparatus of a second aspect of the invention is a digital lane mark generation apparatus in an aircraft for generating a digital lane mark indicating a driving orbit of a vehicle, including GPS coordinate reception means for obtaining GPS coordinates which are global geodetic coordinates (X, Y, Z) of the vehicle from a GPS satellite, gyro sensor means for calculating measurement values of the gradient ($\psi$, $\theta$, $\phi$) by measuring the gradient of the aircraft, a camera for photographing the outside of the aircraft as a camera image, and digital lane mark generation means for generating the digital lane mark indicating the driving orbit of the vehicle, including lane mark detection means for detecting a lane mark of the road from a camera image photographed by the camera and including an internal timer for generating time information (t), wherein the digital lane mark generation means generates the digital lane mark, by relating lane mark information of the road detected by the lane mark detection means, the global geodetic coordinates (X, Y, Z), and the measurement values of the gradient ($\psi$, $\theta$, $\phi$), to the standard time information (t) of the internal timer, and by using a line segment (S), a circular arc (R), and/or a clothoid curve (A).

The time information (t) may be generated by standard time generation means.

Here, the standard time generation means may preferably be the GPS coordinate reception means, and time information (t) may be generated based on the GPS time obtained from GPS information by the GPS coordinate reception means.

Also, time information (t) may be generated based on a gyro time obtained from gyro information by the gyro sensor means which calculates the measurement values of the gradient ($\psi$, $\theta$, $\phi$) by measuring the gradient of the vehicle.

Also, the digital lane mark generation means may generate the digital lane mark indicating the driving orbit of the vehicle, by relating the global geodetic coordinates (X, Y, Z), the measurement values of the gradient ($\psi$, $\theta$, $\phi$), and a camera image, to the distance of the road as the driving distance measuring point (l) of the driving distance of the vehicle, and by using a line segment (S), a circular arc (R), a clothoid curve (A), an altitude (z), a longitudinal gradient, and/or a crossing gradient cant.

The distance meter may be a rotary encoder or a vehicle speed pulse transmitter.

The apparatus in a vehicle of this invention allows to simultaneously obtain various pieces of information required for generating a three dimensional mathematical expression orbit map (a digital lane mark) and controls information mentioned above by relating the standard time, enabling to generate the inexpensive and highly accurate three dimensional mathematical expression orbit map (the digital lane mark).

BRIEF DESCRIPTION OF THE DRAWINGS

FIG. 2 shows a diagrammatic illustration of camera devices 19 and a plurality of road surface roughness sensors 18 installed in a vehicle;

FIG. 3 shows diagrammatic cross sectional illustrations of IC tags placed on a road surface;

FIG. 9 shows the figure of a curvature radius 1/R;

FIG. 19 shows a generated three dimensional mathematical expression orbit map (a digital lane mark); and FIG. 20 shows a digital lane mark generation apparatus of this invention.

DETAILED DESCRIPTION OF THE INVENTION

Figure 1:
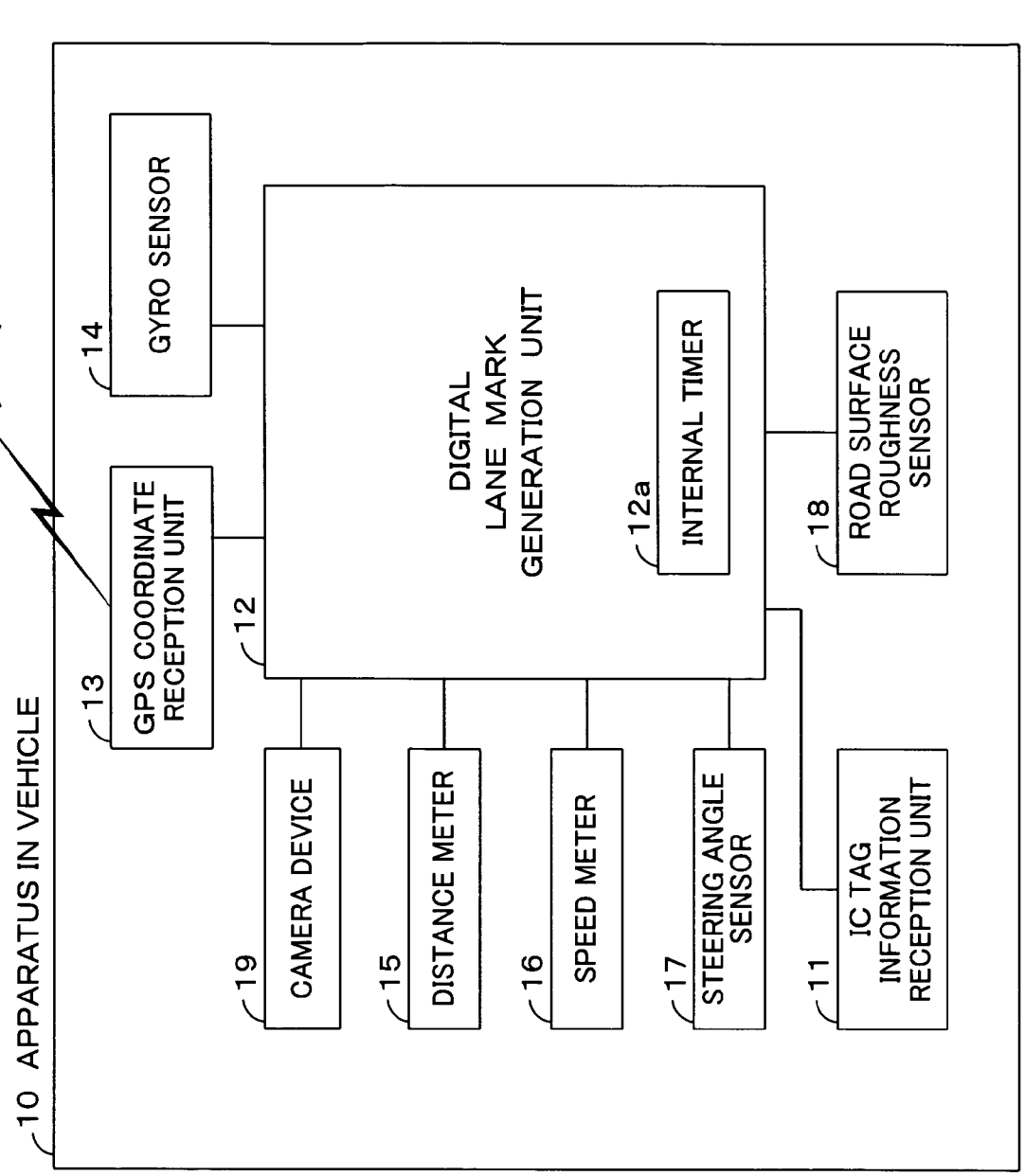
FIG. 1 shows a digital lane mark generation apparatus of this invention.

Below, an embodiment of a digital lane mark generation apparatus of the invention is explained, referring to the drawings.

FIG. 1 shows a digital lane mark generation apparatus of this invention. This digital lane mark generation apparatus is a digital lane mark generation apparatus in a vehicle (an apparatus in a vehicle) 10, which is for generating a digital lane mark indicating the driving orbit of a vehicle. The apparatus includes a GPS coordinate reception unit 13, which obtains GPS coordinates which are global geodetic coordinates (X, Y, Z) of the vehicle from a GPS satellite 20; a gyro sensor 14, which calculates measurement values of a gradient ($\psi$, $\theta$, $\phi$) by measuring a gradient of the vehicle; one or more camera devices 19, which photograph the outside of the vehicle as a camera image; a distance meter 15, which measures a driving distance measuring point (l) of the driving distance of the vehicle; a speed meter 16, which measures speed of the vehicle (v); a steering angle sensor 17, which measures a steering angle of the steering wheel of the vehicle (ρ); one or more road surface roughness sensors 18, which detects the road surface roughness (δ); an IC tag information reception unit 11, which detects tag position information from the IC tag placed on the road surface; an internal timer 12a; and a digital lane mark generation unit 12, which generates the three dimensional mathematical expression orbit map (a digital lane mark) indicating the driving orbit of the vehicle, by relating the global geodetic coordinates (X, Y, Z), measurement values of the gradient (ψ, θ, φ), a camera image, a driving distance measuring point (l), a vehicle speed (v), a steering angle (ρ), a road surface roughness (δ), and/or tag position information, to a standard time (t) of an internal timer 12a, and by using a line segment (S), a circular arc (R), a clothoid curve (A), an altitude (Z), a longitudinal gradient, and/or a crossing gradient cant.

FIG. 2 illustrates the camera devices 19 and a plurality of road surface roughness sensors 18 in a vehicle. The camera devices 19 are a front camera 19a, which photographs the front of the vehicle, an oblique front camera 19b, which photographs diagonally forward underneath, a side camera 19c, which photographs a side of a vehicle, and a downward camera 19d, which are installed in front or back of the vehicle and photographs directly below the vehicle.

Also, the front cameras 19a can be two stereo pair front cameras 19a-R, and 19a-L, which photograph the front of the vehicle.

The digital lane mark generation unit 12 uses all or part of the camera image photographed by the front camera 19a, the oblique front camera 19b, the side camera 19c, and the downward camera 19d. An additional front camera or cameras to two of them further improve accuracy. Here the front camera 19a, the oblique front camera 19b, the side camera 19c, and the downward camera 19d can be ordinary cameras such as CMOS (Complementary Metal Oxide Semiconductor) or CCD (Charge Coupled Device). Also, the side camera 19c and downward camera 19d are line sensors to recognize the lane mark, and the digital lane mark generation unit 12 quickly processes and uses lane mark information recognized by these line sensors (the side camera 19c and the downward camera 19d).

Also, a plurality of road surface roughness sensors 18 are preferably installed under the body of the vehicle.

FIG. 3 illustrates a cross section of IC tags placed on a road surface. In FIG. 3 an IC tag 30 and an antenna 32 are adhered to the top of the IC tag rivet 31 by the adhesive. The IC tag rivets 31 are hammered or placed on the surface of a road in the prescribed position at a prescribed or certain spacing. For example, the IC tag rivets can be placed in a lane mark, a center line of a road, a center of a driving road, a beacon pole, a light pole, a curbstone edge, a guard rail, a wall railing of a bridge, an over bridge, a start or end point of a circular arc and a clothoid. Here, the IC tag 30 can be used as a standard point of a map (a sign post) for general vehicles using a digital lane mark.

Figure 4:
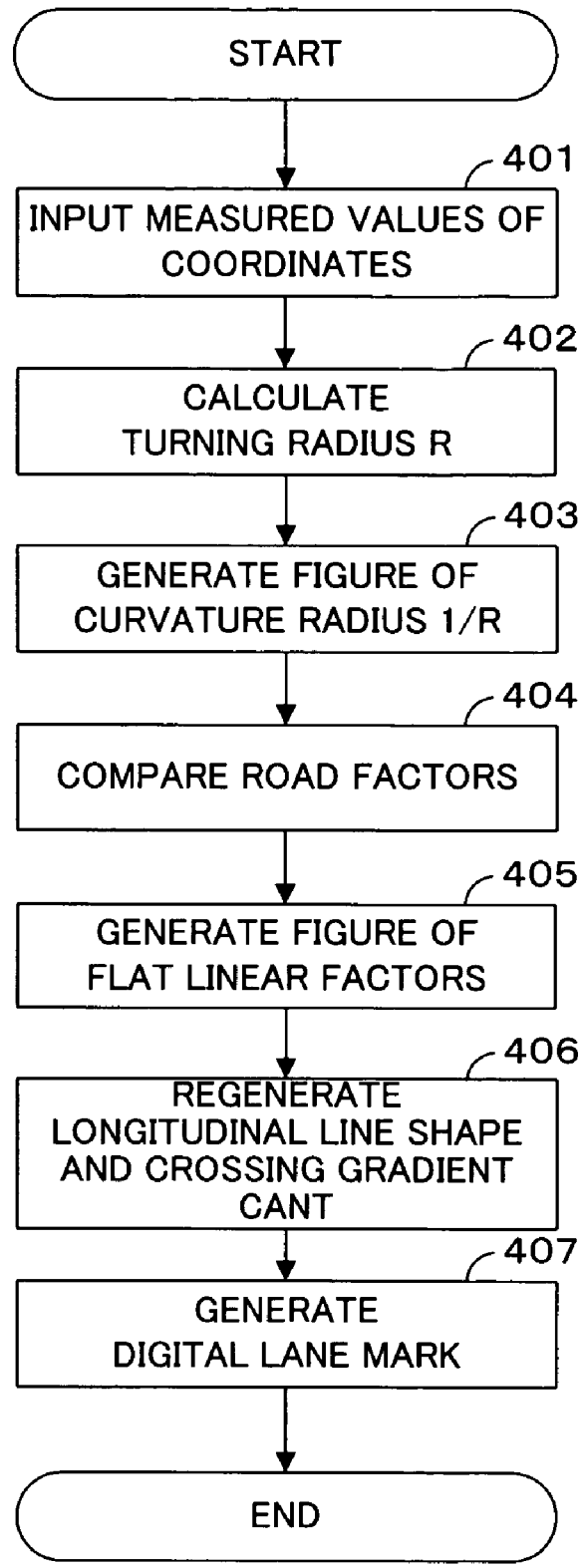
FIG. 4 is a flow chart showing the method of generating a three dimensional mathematical expression orbit map (a digital lane mark)

FIG. 4 is a flow chart showing a method of generating a three dimensional mathematical expression orbit map (a digital lane mark). In FIG. 4, global geodetic coordinates (X, Y, Z), measurement values of the gradient (ψ, θ, φ), a camera image, a driving distance measuring point (l), a vehicle speed (v), a steering angle (ρ), a road surface roughness (δ), and/or tag position information are input in digital lane mark generation unit 12 (step 401). Here, the measurement values of the gradient (ψ, θ, φ) are values calculated as data for calculating vehicle movement, such as: yawing ψ, which is based on a displacement angle in road information; pitching θ, which is based on a longitudinal gradient (slope gradient); and rolling φ, which is based on a crossing gradient of a road surface (cant).

Figure 5:
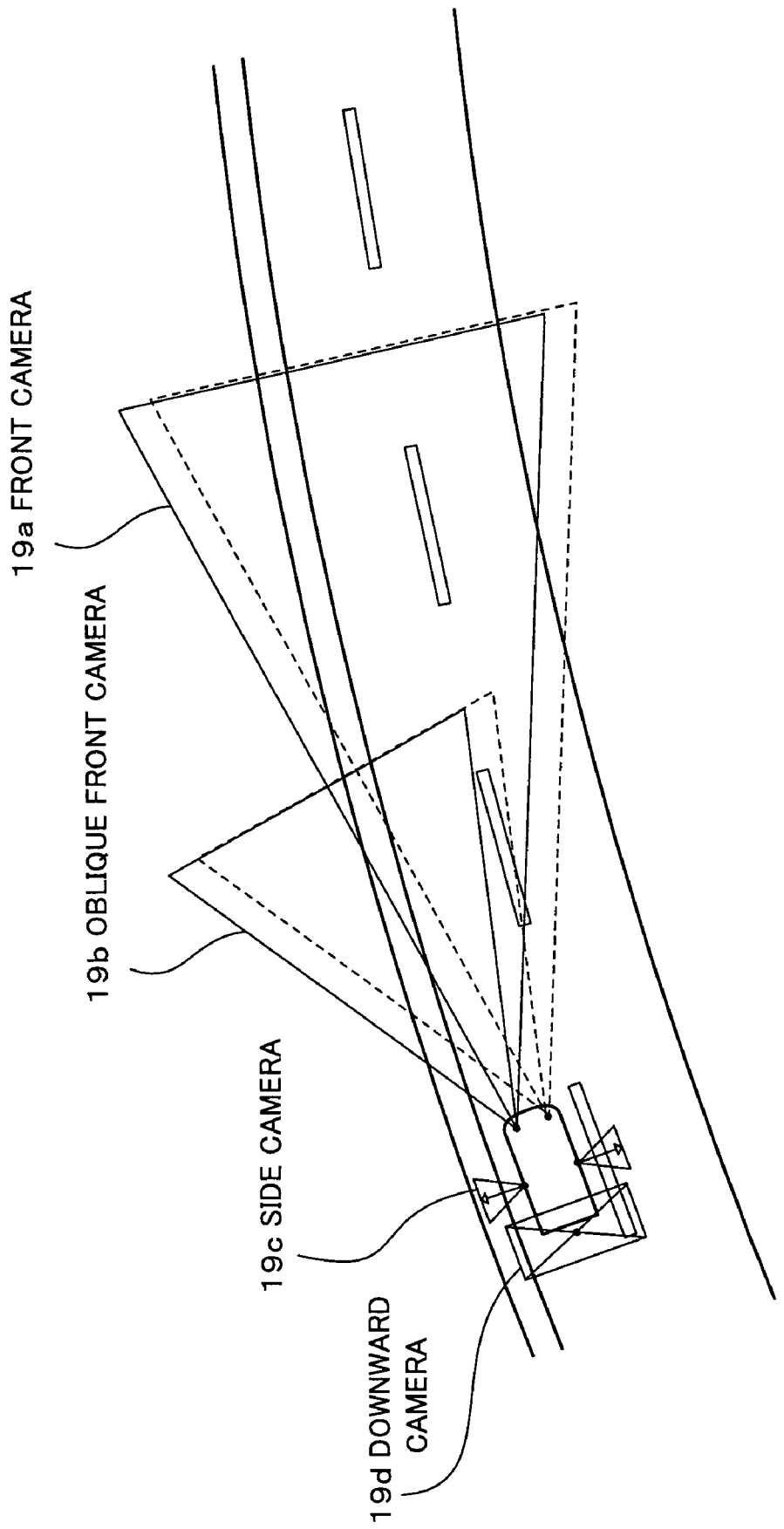
FIG. 5 shows one example of the photographing range of a camera device.
Figure 6:
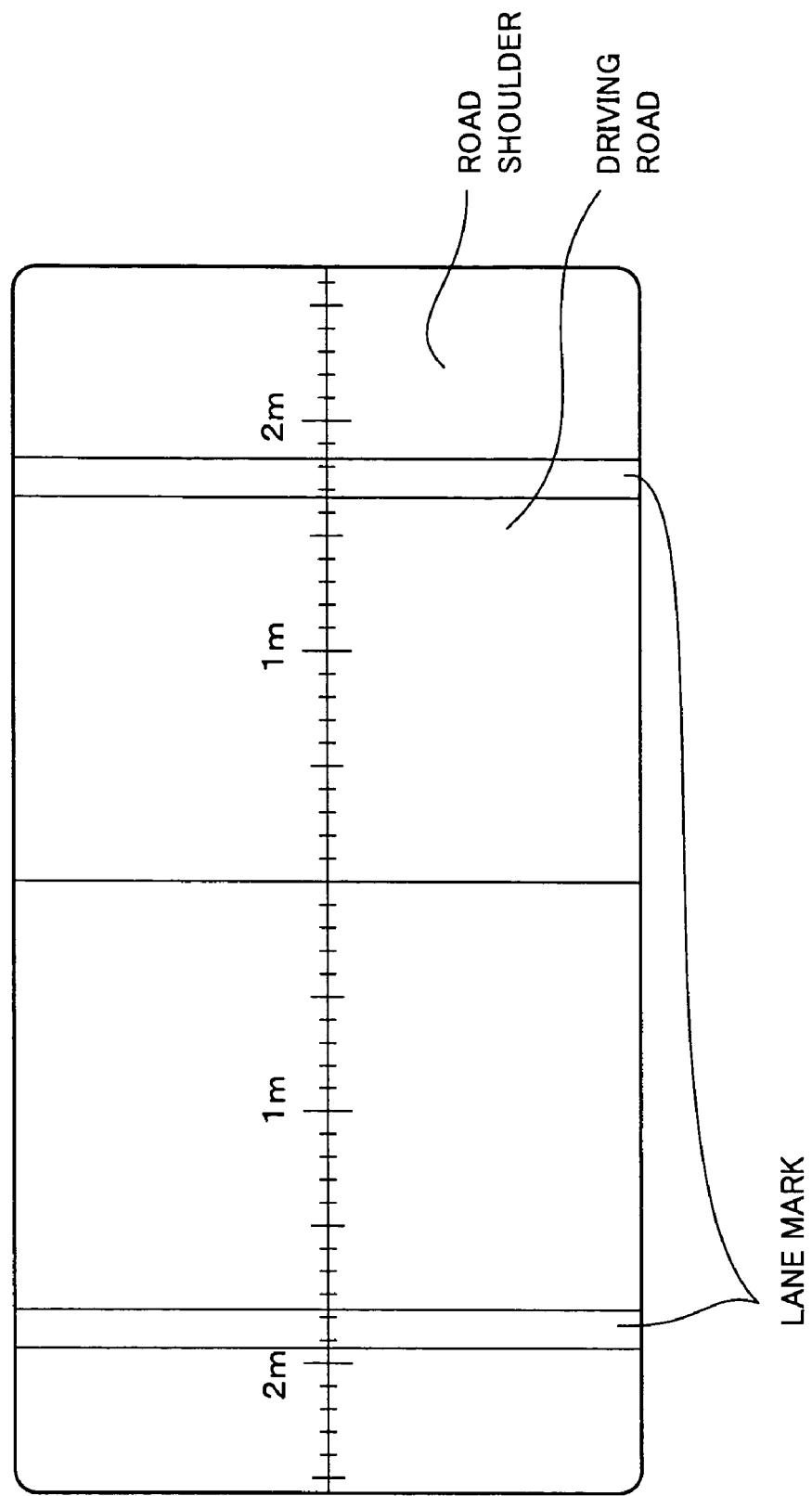
FIG. 6 shows one example of a photographed image by a camera device.
Figure 7:
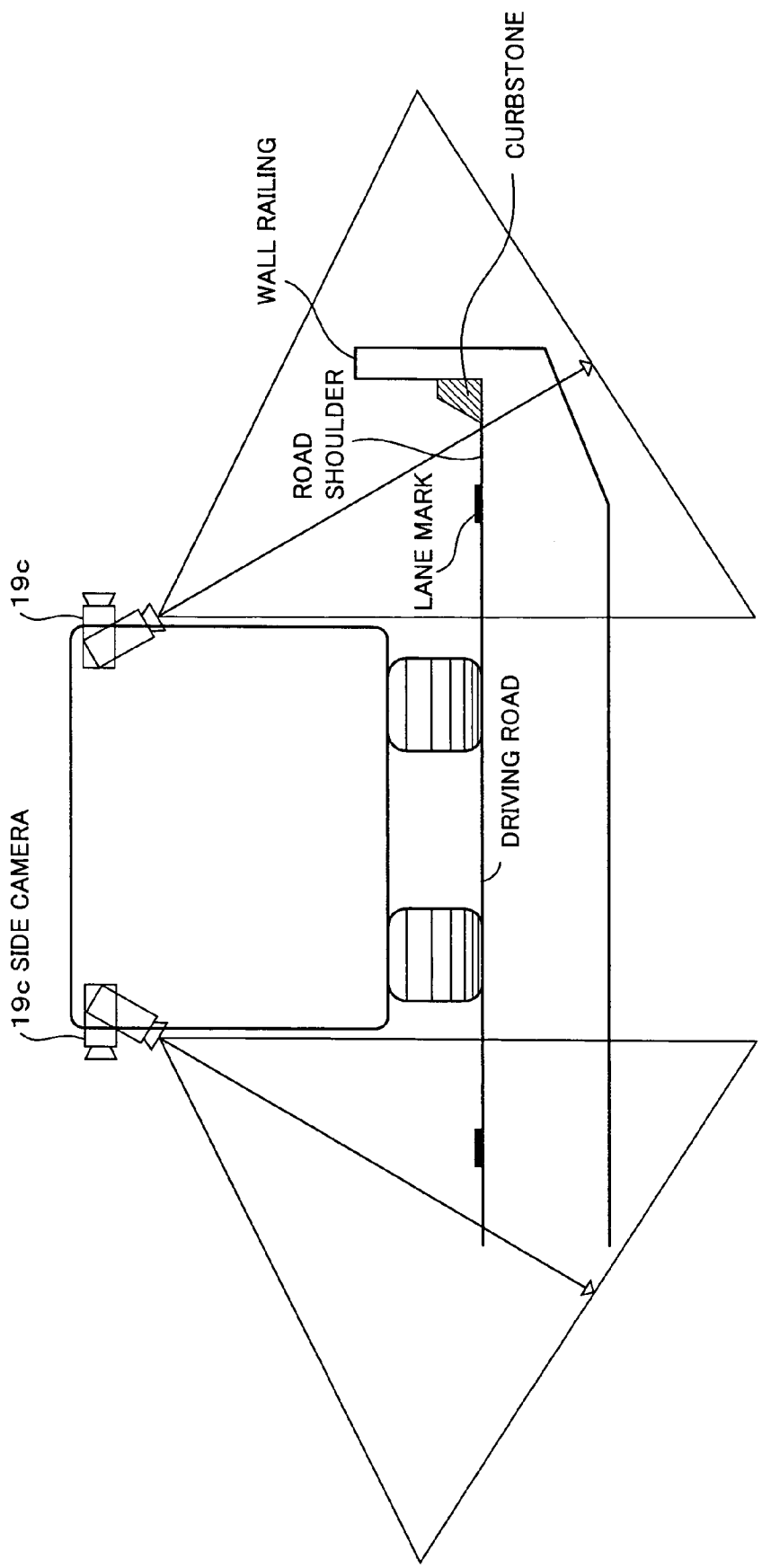
FIG. 7 shows one example of the photographing range of a camera device.
Figure 8:
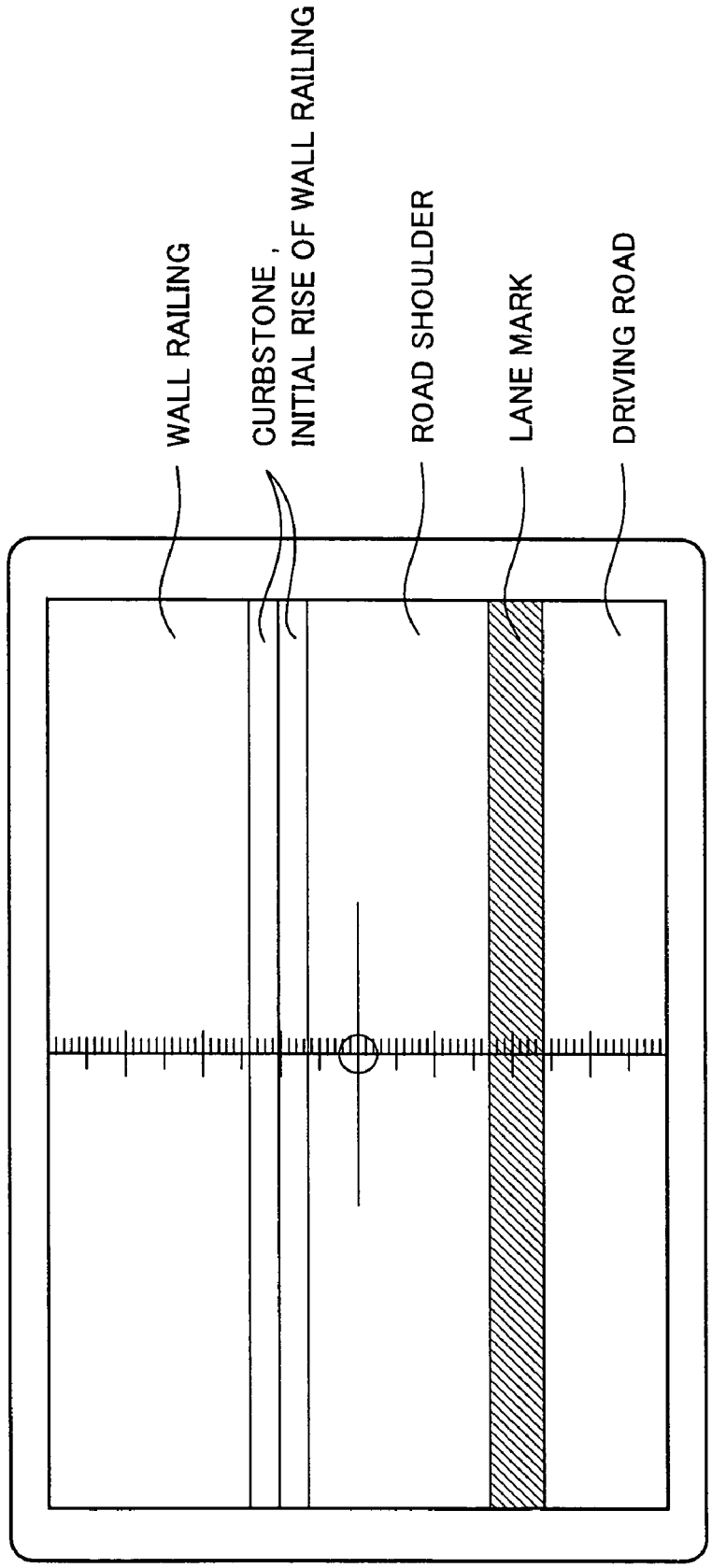
FIG. 8 shows one example of the photographed image by a camera device.
Figure 10A:
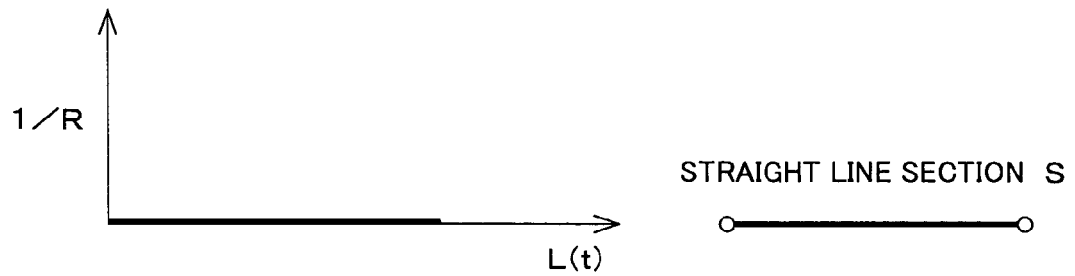
FIG. 10 shows patterns of road factors.
Figure 10B:
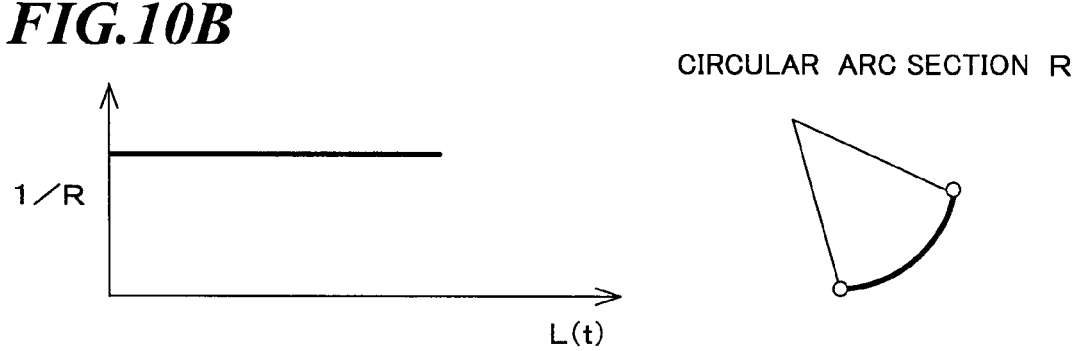
Figure 10C:
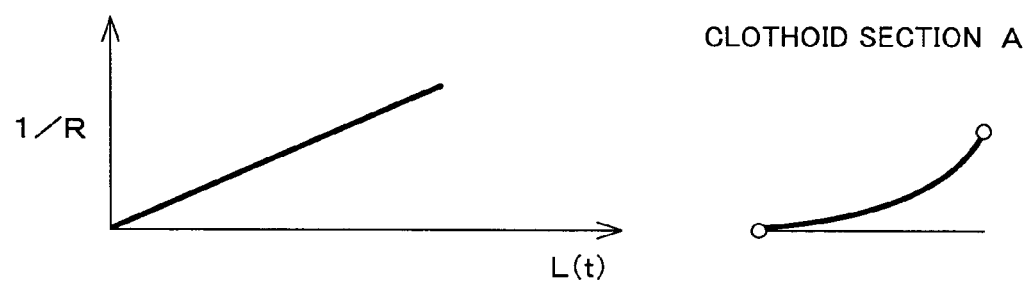
Figure 10D:
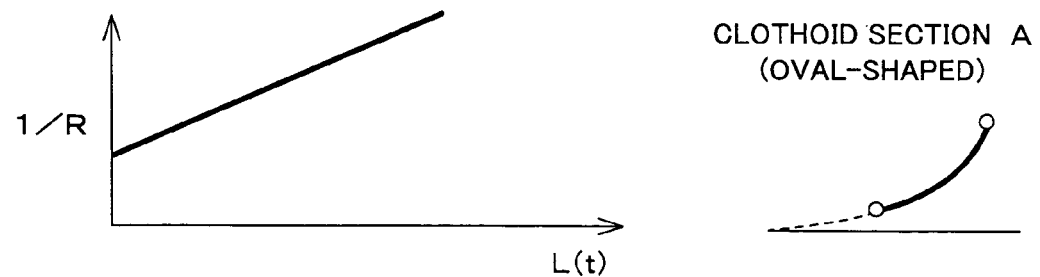

FIG. 5 through FIG. 8 show examples of a photographing range and photographed image by the camera device. The camera image (FIG. 6 and FIG. 8) photographed by the camera devices shown in FIG. 5 and FIG. 7 are input in the digital lane mark generation unit 12. In FIG. 6 and FIG. 8, a camera image, image by a line sensor, and a scale in the image are used for detecting "the shift" from the center line of the road (a center of a driving road or a center of a figure), and the driving orbit of the measurement vehicle can be detected from a downward image by the downward camera 19d, a side image by the side camera 19c using the GPS coordinate reception unit 13 and a gyro sensor 14. By this means, "the shift" from the center line of the road (center of the driving road or a center of the figure) can be appropriately corrected. Sometimes the vehicle cannot drive the center of the driving road, for example, when there is an accident car or a broken car on the way. In such a case or when a measurement vehicle cannot drive on the same driving position as the last measuring driving, the shift is corrected. Since conventional measurement vehicle equipped with the GPS dose not have such correcting functions, the accurate point sequence of the center of the road (the center of the driving road) cannot be obtained. However, this invention enables to obtain accurate point sequence of the center of the road (center of the driving road). Moreover, a driver of the measurement vehicle need not always keep driving on the measuring center of the driving road (center of the driving road), which reduces the driver's stress. Also, the measured center of the road (center of the driving road) and actual center of the road (center of the driving road) need not be necessarily the same. For example, the measured center of the road (center of the driving road) can be redefined to be one meter to the right or left from the center of the road (center of the driving road), or one meter to the left or right to the lane mark.

The digital lane mark generation unit 12 calculates a turning (curve) radial R of the road using at least one of the values among the global geodetic coordinates (X, Y, Z), the measurement values of the gradient (ψ, θ, φ), or a steering angle (ρ) (step 402) and then generates the figure of a curvature radius 1/R (step 403, FIG. 9). Here, FIG. 9 shows a figure of a curvature radius 1/R.

Next, four patterns of the road factors (a straight line section S, a circular arc R, a clothoid A, a clothoid A (oval-shaped)) are compared (step 404, FIG. 10). Here, FIG. 10 shows patterns of the road factors.

Figure 11:
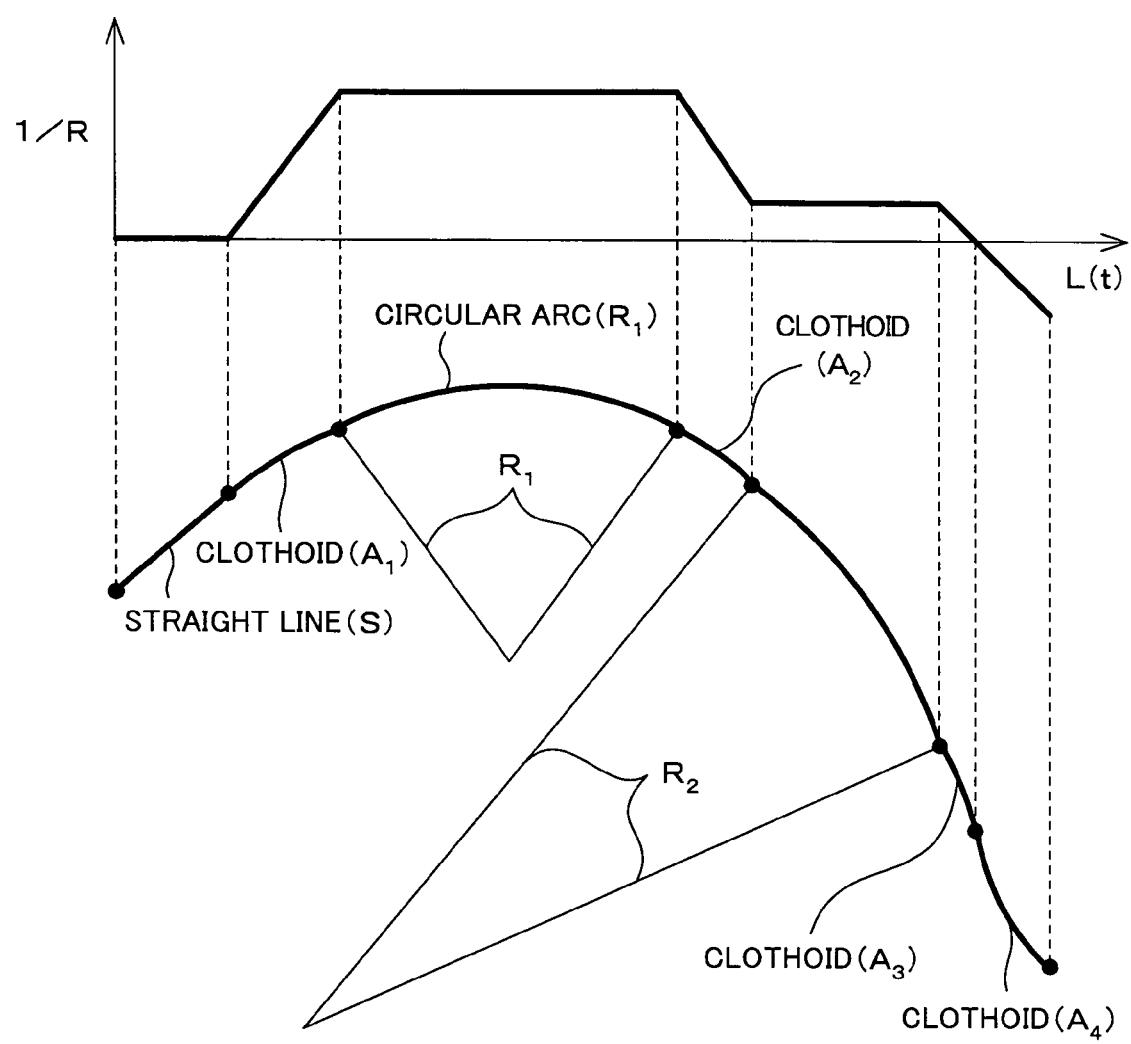
FIG. 11 shows a figure of flat linear factors.

By the comparison in step 404, the road factors of the driving orbit are determined, and the figure of flat linear factors (FIG. 11) is generated (step 405).

Next, a longitudinal line shape and a crossing gradient cant are regenerated (step 406). Here, the longitudinal line shape is generated using longitudinal linear data like an altitude (z) and VCL (Vertical Curve Length), which can be generated by a specified curved line like a parabola curve. Also, the crossing gradient cant is obtained by the method shown in FIG. 12.

Figure 12:
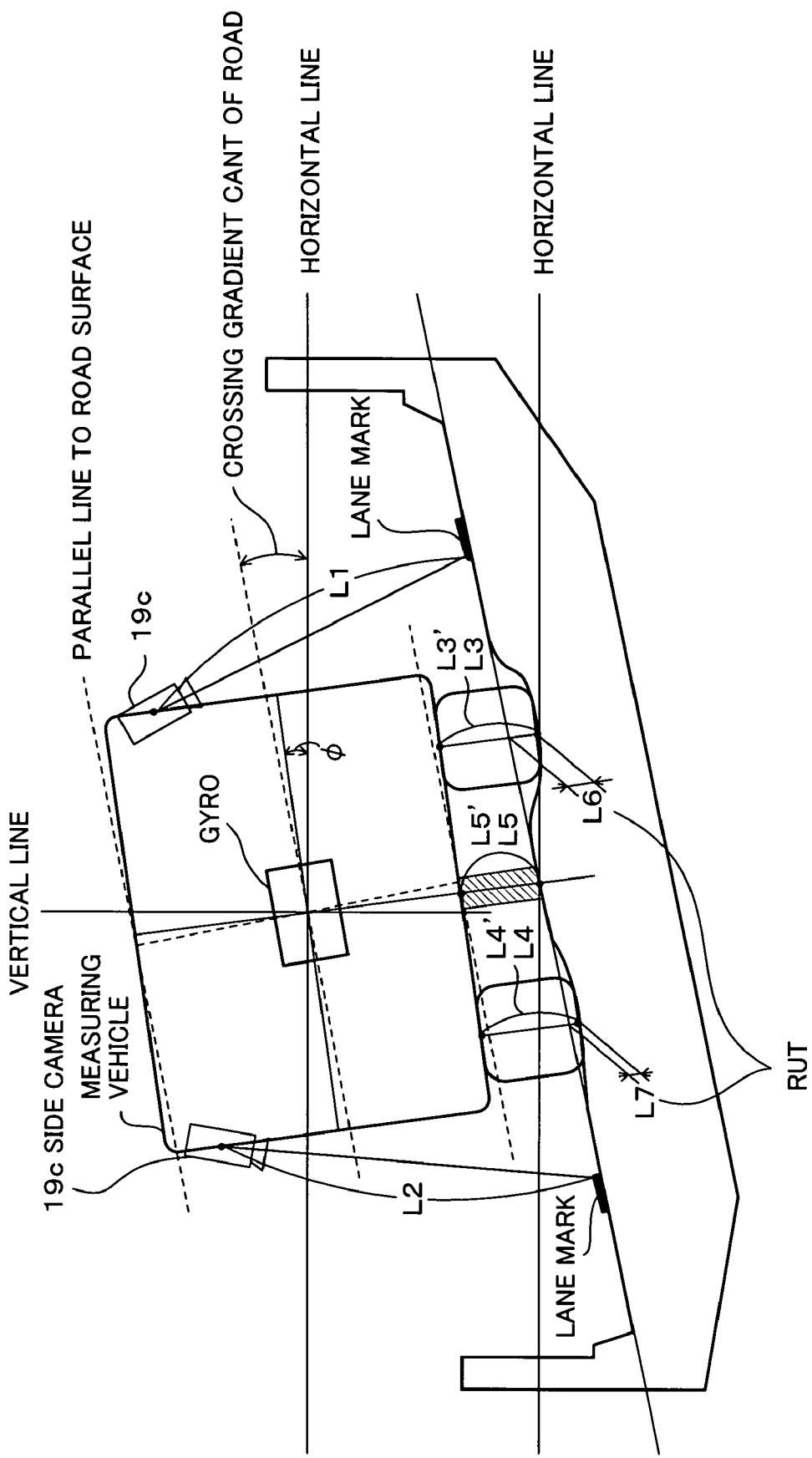
FIG. 12 shows a measuring method of a crossing gradient cant.

FIG. 12 shows the method of measuring the crossing gradient cant. In FIG. 12, the crossing gradient cant is obtained using: a rolling angle (φ) of the gyro sensor; L1 and L2 measured by the camera device 9, a laser, and similar; the rut depth L6 and L7 measured by the road surface roughness sensor 18; and L3, L4, and L5 measured by the noncontact laser displacement gauge (not shown); L3', L4', and L5' measured by a spring, a damper, a calculated value of a moving dynamic response while the vehicle moving in a curve, and a suspension displacement sensor (not shown).

Each value mentioned above is related to the standard time (t) of the internal timer 12a and is controlled. Then, based on these values, the three dimensional mathematical expression orbit map (a digital lane mark) is generated using a line segment (S), a circular arc (R), and/or a clothoid curve (A) (step 407). Here, the time (t) is generated based on the GPS time obtained from GPS information by the GPS coordinate reception unit 13. Otherwise, the time (t) is generated based on a gyro time obtained from gyro information by the gyro sensor 14, which calculates the measurement values of the gradient ($\psi$, $\theta$, $\phi$) by measuring the gradient of the vehicle.

Also, the digital lane mark generation unit 12 generates the digital lane mark indicating the driving orbit of the vehicle, by relating the global geodetic coordinates (X, Y, Z), the measurement values of the gradient ($\psi$, $\theta$, $\phi$), and the camera image, to a distant of the road as the driving distance measuring point (l) of the driving distance of the vehicle, and by using a line segment (S), a circular arc (R), and/or a clothoid curve (A). Here, the distance meter can be a rotary encoder and/or a vehicle speed pulse transmitter.

Figure 13:
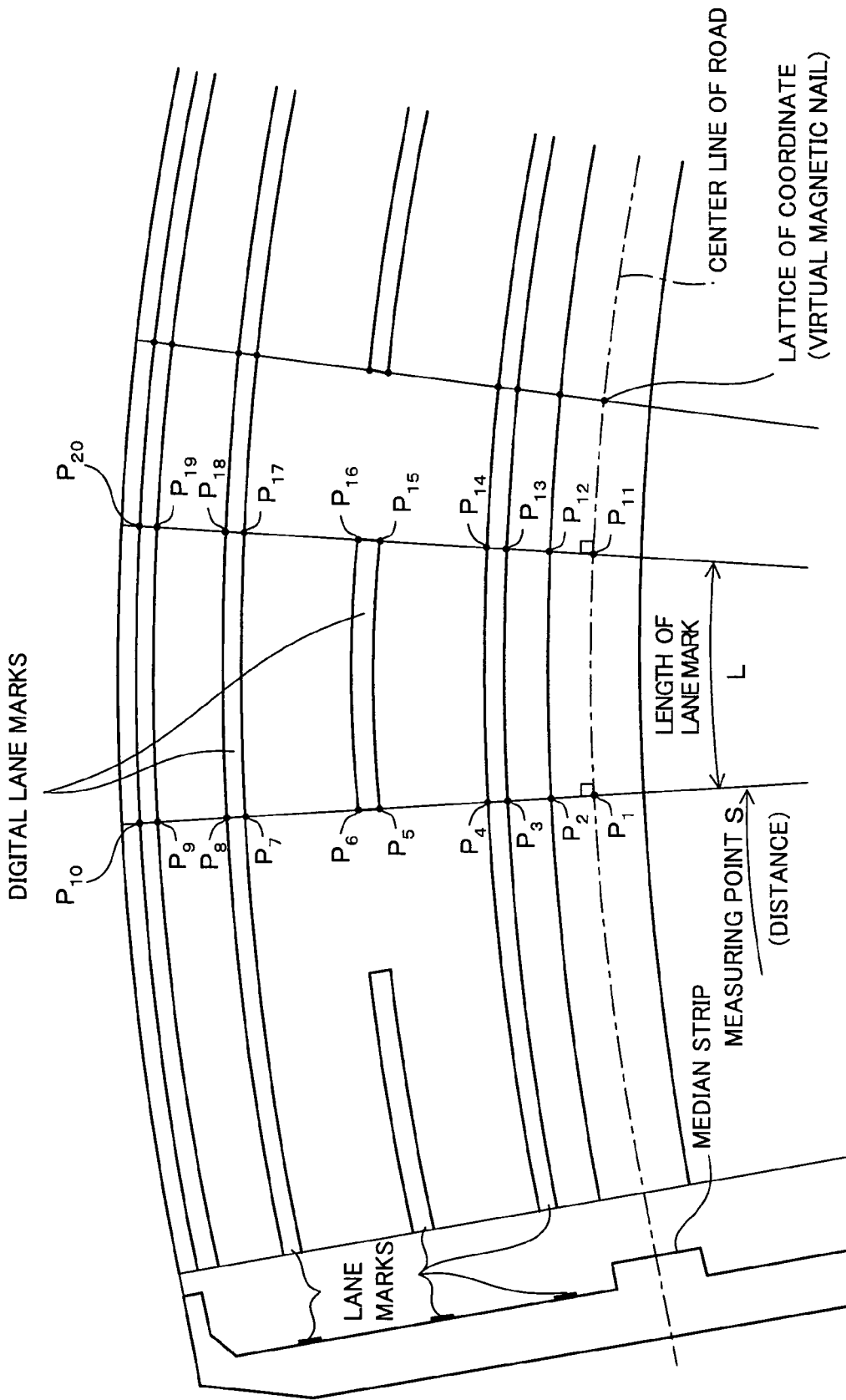
FIG. 13 shows a generated three dimensional mathematical expression orbit map (a digital lane mark)
Figure 14:
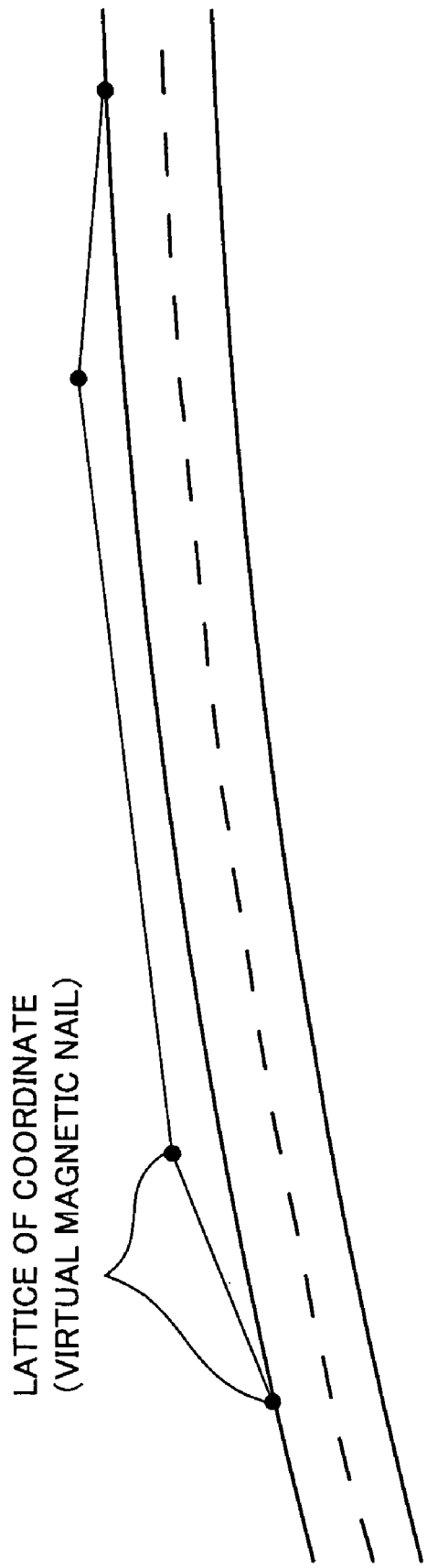
FIG. 14 shows a generated three dimensional mathematical expression orbit map (a digital lane mark)
Figure 15:
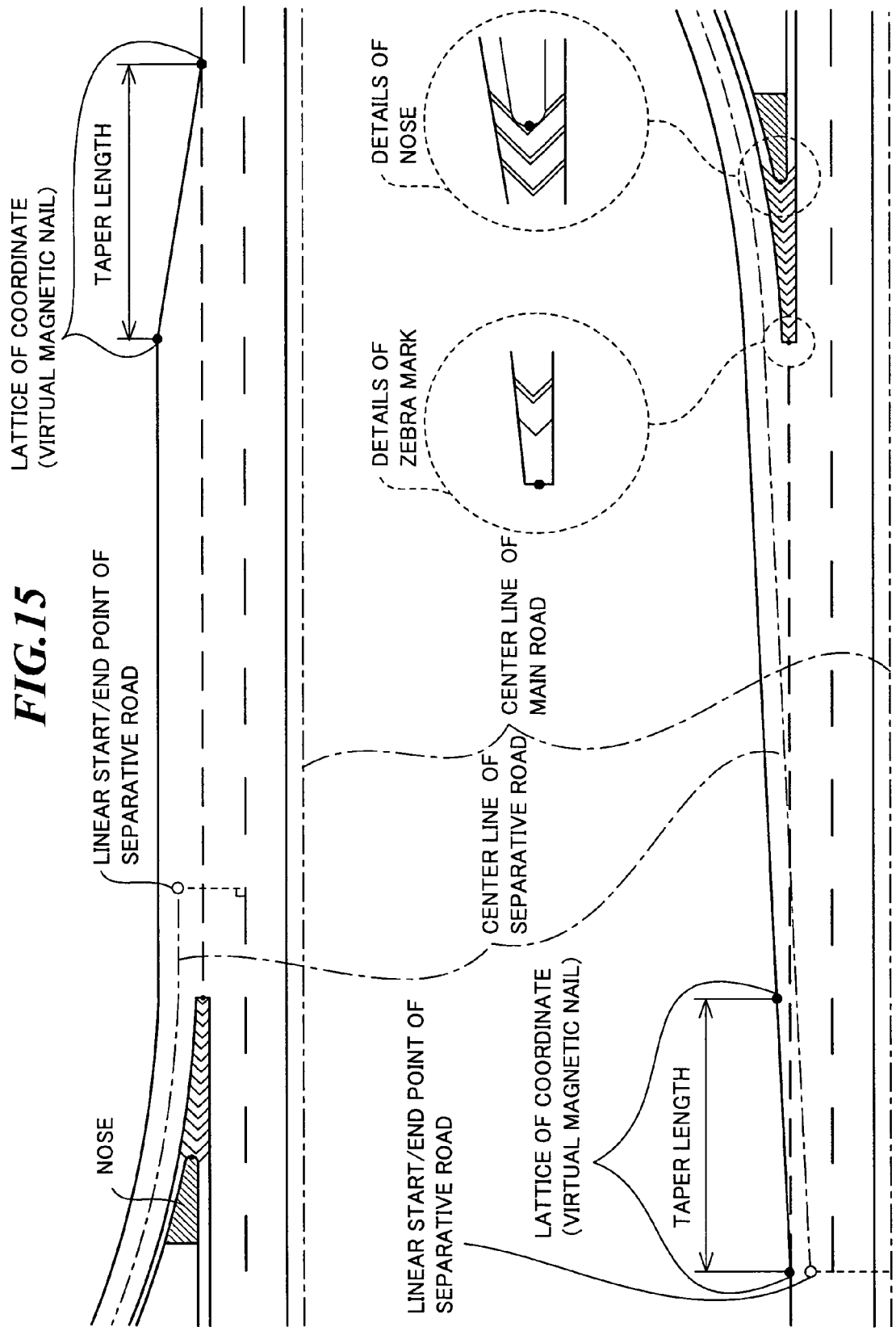
FIG. 15 shows a generated three dimensional mathematical expression orbit map (a digital lane mark)
Figure 16:
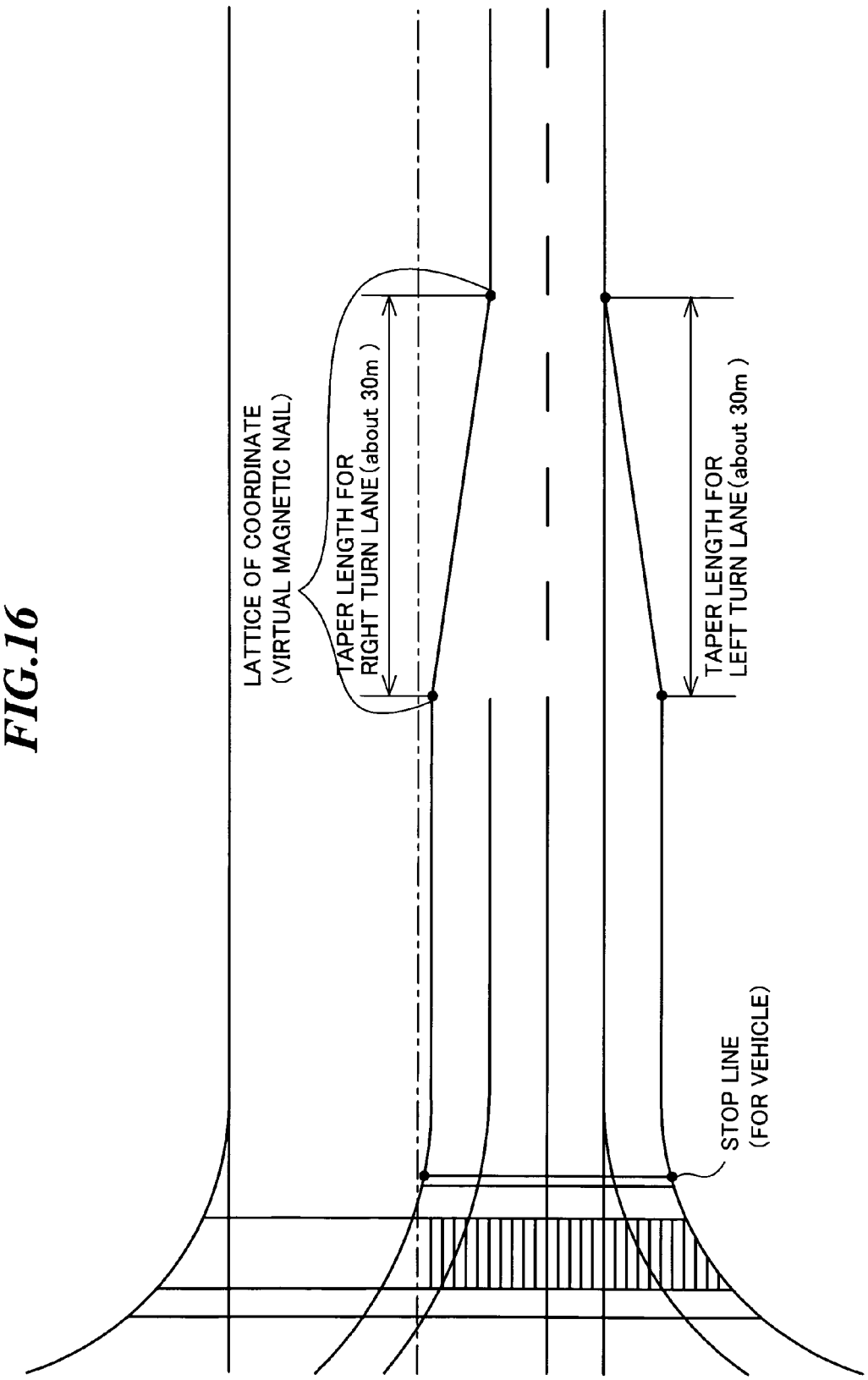
FIG. 16 shows a generated three dimensional mathematical expression orbit map (a digital lane mark)

The FIG. 13 through FIG. 16 show a generated three dimensional mathematical expression orbit map (a digital lane mark). FIG. 13 shows a general road. FIG. 14 shows an uphill driving lane. FIG. 15 shows a nose at the start or end point of a separative road of an express way. FIG. 16 shows a three dimensional mathematical expression orbit map (a digital lane mark) of the general flat crossing. In FIG. 13 the values of P1 through P20 are calculated as offset values vertical with the center line of the road. Also, in the narrow road with no lane mark, a characteristic line like a pavement edge and a shoulder edge is assumed as a digital lane mark.

Figure 17:
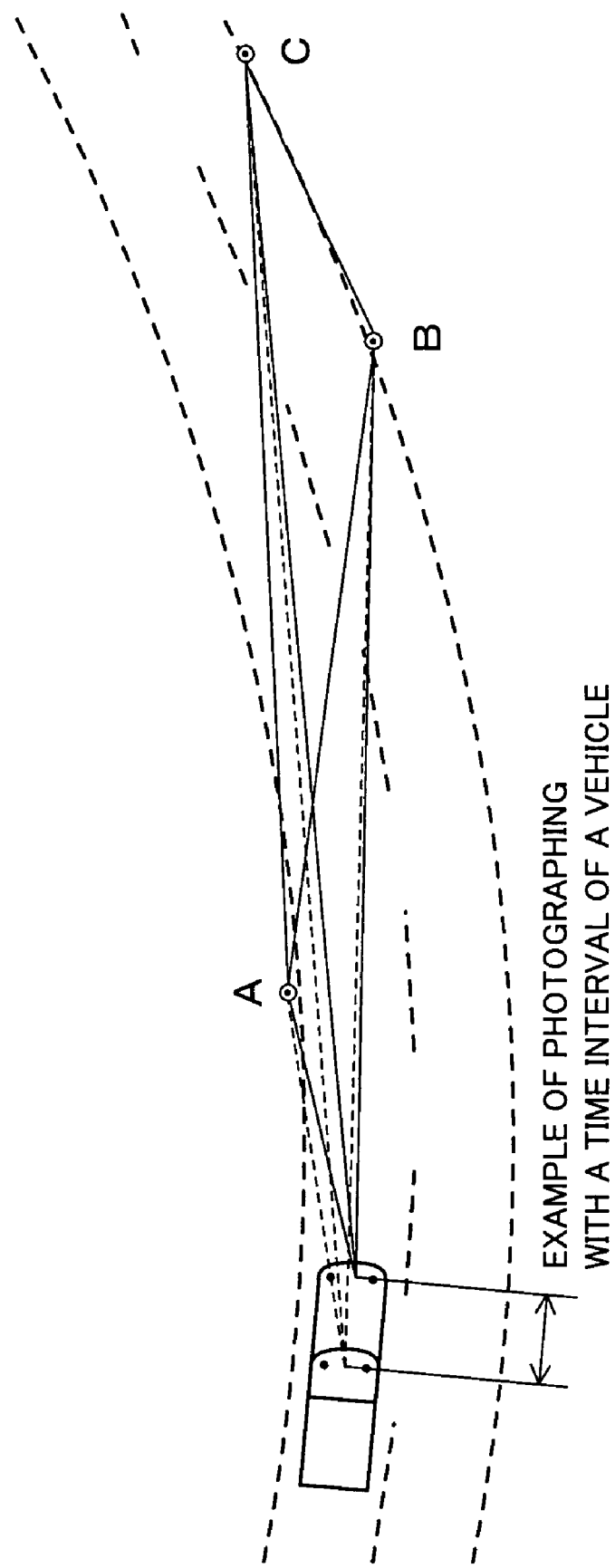
FIG. 17 shows a photographing method by two stereo pair front cameras 19a-R, and 19a-L.
Figure 18:
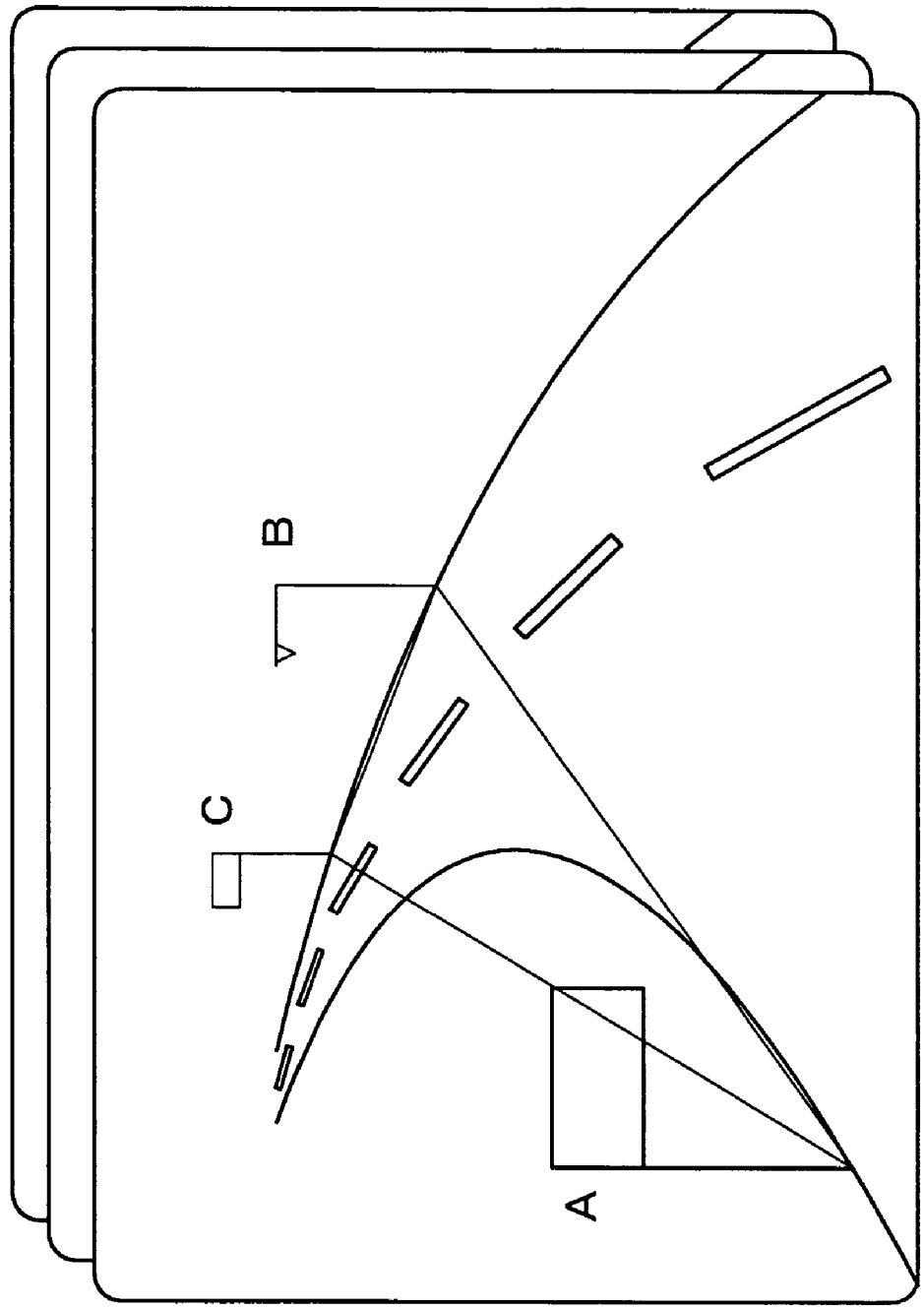
FIG. 18 shows a stereo pair image photographed by two stereo pair front cameras 19a-R, and 19a-L.

FIG. 17 shows the photographing method by the two stereo pair front cameras 19a-R and 19a-L. Also, FIG. 18 shows a stereo pair image photographed by the two stereo pair front cameras 19a-R and 19a-L. In this way, by using a stereo pair image, a three dimensional mathematical expression orbit map (a digital lane mark) shown for example in FIG. 19 is generated.

FIG. 20 shows a digital lane mark generation apparatus of this invention. The digital lane mark generation apparatus is the digital lane mark generation apparatus in an aircraft like a helicopter (apparatus in an aircraft) 50, which is for generating a digital lane mark indicating the driving orbit of a vehicle, including: a GPS coordinate reception unit 13, which obtains GPS coordinates which are global geodetic coordinates (X, Y, Z) of the vehicle from a GPS satellite 20; a gyro sensor 14, which calculates the measurement values of the gradient ($\psi$, $\theta$, $\phi$) by measuring the gradient of the aircraft; a camera device 19, which photographs the outside of the aircraft as a camera image; and a digital lane mark generation unit 52, which generates the digital lane mark indicating a driving orbit of the vehicle, including a lane mark detection unit 52b, which detects a lane mark of the road from a camera image photographed by the camera device 19; and an internal timer 52a, which generates time information (t), wherein the digital lane mark generation unit 52 generates the digital lane mark, by relating lane mark information of the road detected by the lane mark detection unit 52b, the global geodetic coordinates (X, Y, Z), and the measurement values of the gradient ($\psi$, $\theta$, $\phi$), to standard time information (t) of the internal timer 52a, and by using a line segment (S), a circular arc (R), and/or a clothoid curve (A).

Here, in generating the digital lane mark, by processing the same steps shown in FIG. 4, a three dimensional mathematical expression orbit map (the digital lane mark) indicating the driving orbit of the vehicle can be generated using a line segment (S), a circular arc (R), and/or a clothoid curve (A).

Here, in the digital lane mark generation apparatus shown in FIG. 1 and FIG. 20, time information (t) is preferably generated based on a GPS time obtained from GPS information by the GPS coordinate reception unit 13.

The digital lane mark generation apparatus of this invention allows to simultaneously obtain various pieces of information required for generating a three dimensional mathematical expression orbit map (a digital lane mark) and controls these information with standard time, enabling to generate an inexpensive and highly accurate three dimensional mathematical expression orbit map (a digital lane mark).

The invention claimed is:

1. A digital lane mark generation apparatus for use in a vehicle for generating a digital lane mark indicating a driving orbit of a vehicle, the digital lane mark generation apparatus comprising:
   GPS coordinate reception means for obtaining GPS coordinates, which are global geodetic coordinates (X, Y, Z), of the vehicle from a GPS satellite;
   gyro sensor means for calculating measurement values of a gradient ($\psi$, $\theta$, $\phi$) by measuring the gradient of the vehicle;
   at least one of a side camera for photographing a side of the vehicle and a downward camera for photographing directly below the vehicle; and
   digital lane mark generation means for generating a digital lane mark indicating the driving orbit of the vehicle, the digital lane mark being generated by (i) relating the global geodetic coordinates (X, Y, Z), the calculated measurement values of the gradient ($\psi$, $\theta$, $\phi$), and a camera image, which is an image photographed from the at least one of the side camera and the downward camera, to a standard time (t), and (ii) using a line segment (S), a circular arc (R), a clothoid curve (A), an altitude (Z), a longitudinal gradient, and/or a crossing gradient cant.

2. The digital lane mark generation apparatus according to claim 1, further comprising front cameras that are a stereo pair of front cameras for photographing a front of the vehicle,
   wherein the digital lane mark generation means uses, as the camera image an image photographed by the stereo pair of front cameras.

3. The digital lane mark generation apparatus according to claim 2,
   wherein the side camera and the downward camera are line sensors for recognizing lane mark information, and
   wherein the digital lane mark generation means processes and uses the recognized lane mark information.

4. The digital lane mark generation apparatus according to claim 1, further comprising a distance meter for measuring a driving distance measuring point (l) of a driving distance of the vehicle,
   wherein the digital lane mark generation means generates the digital lane mark by relating the driving distance measuring point (l) to the standard time (t).

5. The digital lane mark generation apparatus according to claim 4, wherein the digital lane mark generation means generates the digital lane mark by (i) relating the global geodetic coordinates (X, Y, Z), the measurement values of the gradient ($\psi$, $\theta$, $\phi$), and the camera image, to a distance of the road as the driving distance measuring point (l) of the driving distance of the vehicle, and (ii) using the line segment (S), the circular arc (R), and/or the clothoid curve (A).

6. The digital lane mark generation apparatus according to claim 5, wherein the distance meter is a rotary encoder.

7. The digital lane mark generation apparatus according to claim 5, wherein the distance meter is a vehicle speed pulse transmitter.

8. The digital lane mark generation apparatus according to claim 1, further comprising a speedometer for measuring a speed of the vehicle (v),
wherein the digital lane mark generation means generates the digital lane mark by relating the speed of the vehicle (v) to the standard time (t).

9. The digital lane mark generation apparatus according to claim 1, further comprising a steering angle sensor for measuring a steering angle (ρ) of a steering wheel of the vehicle,
wherein the digital lane mark generation means generates the digital lane mark by relating the steering angle (ρ) to the standard time (t).

10. The digital lane mark generation apparatus according to claim 1, further comprising one or more road surface roughness sensors for detecting road surface roughness (δ),
wherein the digital lane mark generation means generates the digital lane mark by relating the road surface roughness (δ) to the standard time (t).

11. The digital lane mark generation apparatus according to claim 1, further comprising IC tag information reception means for detecting tag position information from an IC tag hammered or placed on one of a beacon pole, a light pole, a curbstone edge, a guard rail, a wall railing of a bridge, and an overhead bridge,
wherein the digital lane mark generation means generates the digital lane mark by relating the tag position information to the standard time (t).

12. The digital lane mark generation apparatus according to claim 1, wherein the time information (t) is generated by standard time generation means.

13. The digital lane mark generation apparatus according to claim 12,
wherein the standard time generation means is the GPS coordinate reception means, and
wherein the time information (t) is generated based on a GPS time obtained from GPS information by the GPS coordinate reception means.

14. The digital lane mark generation apparatus according to claim 12, wherein the time information (t) is generated based on a gyro time obtained from gyro information by the gyro sensor means which calculates the measurement values of the gradient (ψ, θ, φ) by measuring the gradient of the vehicle.

15. A digital lane mark generation apparatus for use in an aircraft for generating a digital lane mark indicating a driving orbit of a vehicle, the digital lane mark generation apparatus comprising:
GPS coordinate reception means for obtaining GPS coordinates, which are global geodetic coordinates (X, Y, Z), of the aircraft from a GPS satellite;
gyro sensor means for calculating measurement values of a gradient (ψ, θ, φ) by measuring the gradient of the aircraft;
at least one of a side camera for photographing a side of the aircraft and a downward camera for photographing directly below the aircraft; and
digital lane mark generation means for generating the digital lane mark indicating the driving orbit of the vehicle,
wherein the digital lane mark generation means includes:
lane mark detection means for detecting lane mark information of the road from a camera image, which is an image photographed from the at least one of the side camera and the downward camera; and
an internal timer for generating standard time information (t), and
wherein the digital lane mark generation means generates the digital lane mark, by (i) relating the detected lane mark information of the road, the global geodetic coordinates (X, Y, Z), and the calculated measurement values of the gradient (ψ, θ, φ), to the standard time information (t), and (ii) using a line segment (S), a circular arc (R), and/or a clothoid curve (A).

* * * * *